July 12, 1927.
T. J. MELL
1,635,684
METHOD OF MAKING DECORATIVE RUBBER SHEETING
Original Filed Dec. 18, 1924
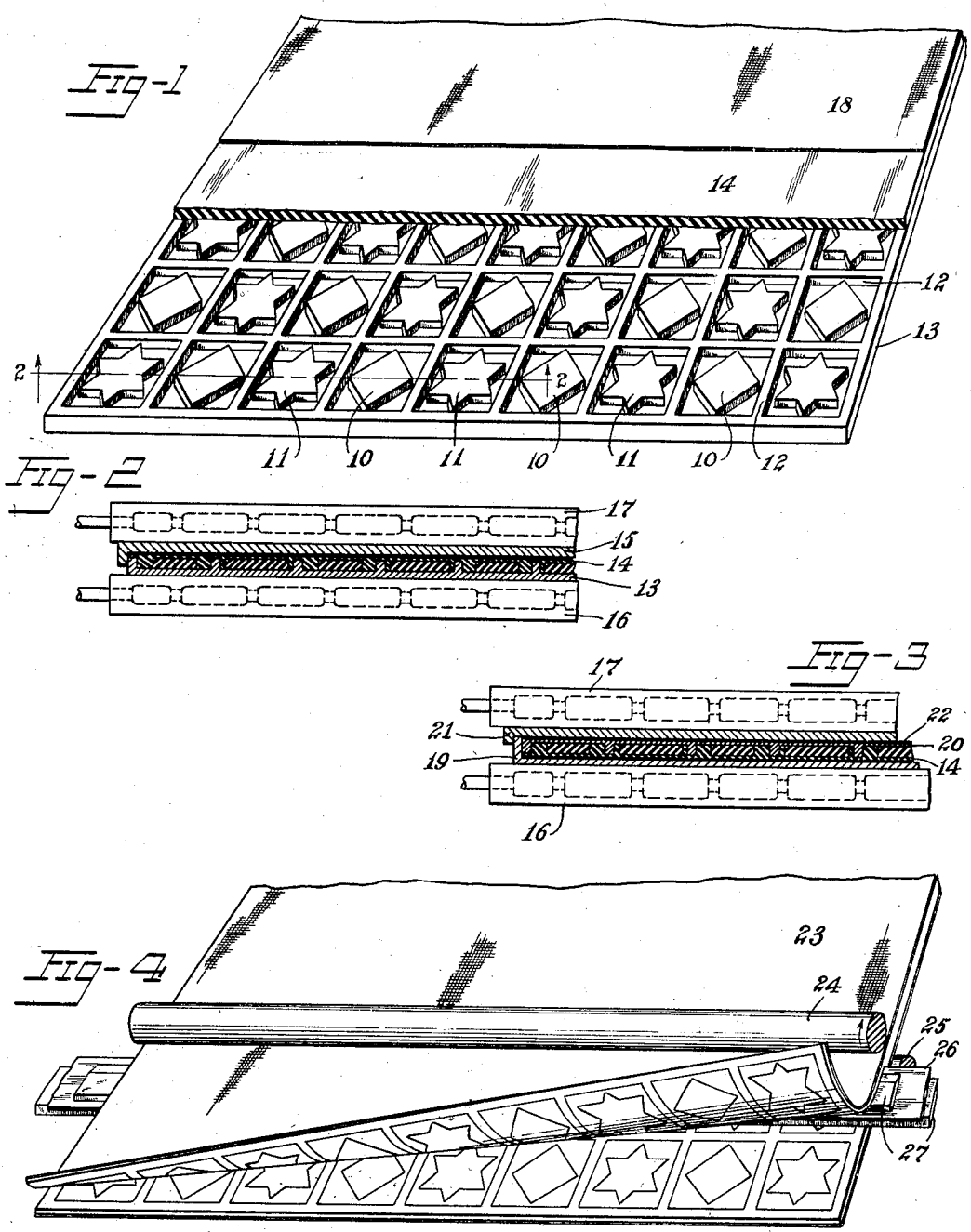
Inventor
Tod J. Mell
By Robert M. Pierson
Atty.

Patented July 12, 1927.

1,635,684

UNITED STATES PATENT OFFICE.

TOD J. MELL, OF AKRON, OHIO, ASSIGNOR TO THE B. F. GOODRICH COMPANY, OF NEW YORK, N. Y., A CORPORATION OF NEW YORK.

METHOD OF MAKING DECORATIVE RUBBER SHEETING.

Application filed December 18, 1924, Serial No. 756,684. Renewed May 11, 1927.

This invention relates to the art of making decorative rubber sheeting or the like, being an improvement upon that of my copending application Serial No. 751,873 filed November 24, 1924, and describing the production of patterned sheets by forming a rubber matrix, flowing rubber of different color into the interstices of the matrix by pressure, and slicing the composite structure through lines of color division. My present invention is also related to that described and claimed in my United States Patent No. 1,588,797, granted June 15, 1926.

One of the chief objects of my present invention is to provide an improved method for producing rubber sheets having relatively extensive figures of solid color or of continuously conglomerate composition. Another object is to provide an improved method for obtaining a three-color sheet or a sheet presenting several configurations of different colors or color-mixtures.

Of the accompanying drawings:

Fig. 1 is a perspective view of a mold-member adapted for the performance of my improved method in its preferred form and the work in plan thereon, at an early stage of the method.

Fig. 2 is a fragmentary cross-section of the same and of a coacting mold member at a later stage, on line 2—2 of Fig. 1, press platens embracing the mold assembly being shown in elevation.

Fig. 3 is a similar view showing a still later stage.

Fig. 4 is a perspective view of a composite sheet in process of being sliced to produce a plurality of sheets.

In the form of my present invention shown in the accompanying drawings, some of the design elements are first formed as individual rubber blocks, a mass of plastic rubber of different color or composition is then flowed into the spaces between the blocks while the latter are supported in spaced relation, said plastic rubber preferably continuing as an integral mass common to and overlying the several blocks. The plastic rubber thus flowed into the spaces between the blocks is preferably so molded as to provide spaces or interstices to be filled by still another application of plastic rubber, to provide another color or color-mixture in the design, the composite mass being sliced through the several elements, preferably after they have been unified by vulcanization.

Referring first to Fig. 1, design elements of stiff rubber composition, here shown as diamond shaped blocks 10, 10 and star-shaped blocks 11, 11, are individually formed as by molding and partially vulcanizing, by cutting them from partially vulcanized sheets, or by shaping them from a comparatively stiff rubber compound, so that they may resist deformation in the subsequent steps. These blocks are placed as shown, or in such design arrangement as may be desired, in the cavities defined by grating elements 12, 12 rising from the face of a mold member 13, the grating elements being integral with the said mold member in the apparatus here shown. The mold section 13, grating elements 12 and design elements 10, 11, thus provide a matrix.

A sheet of plastic rubber compound 14, differing in color from the elements 10 and 11 is then laid over the latter and by heat and pressure caused to flow into the spaces about said elements, as by placing a smooth-faced mold section 15 upon the assembly, said section 15 being adapted to telescope with the section 13, and pressing the mold assembly between hot-plates 16, 17, a fabric backing sheet 18 preferably being laid upon the filler sheet 14 before the upper mold section 15 is mounted. The application of heat and pressure is preferably continued until the filler compound not only fills the spaces about the elements 10, 11 but is partially vulcanized, so as to adhere to said elements and to the fabric backing 16 and acquire sufficient stiffness to resist distortion in a subsequent filling step.

The united elements of the work are then removed from the mold sections 15 and 13 as a unitary assembly and are inverted in a plane-faced mold section 19, the upper face of the assembly then presenting open grooves or interstices molded therein by the grating members 12 of the mold section 13. These grooves are then filled with plastic rubber composition differing in color from that of the sheet 14, placing a sheet of the second filler compound, 20, upon the assembly, applying a top mold section 21, which telescopes with the section 19, and pressing the mold assembly between the hot plates 16, 17 as shown in Fig. 3, a fabric backing sheet 22 preferably being laid upon the filler sheet 20, under the top mold section 21.

The heat and pressure is then maintained until the several elements of the work are firmly united by vulcanization. The vulcanizing time and temperature characteristics of the several rubber compounds are preferably so controlled, by choice and proportion of ingredients, that the several compounds will attain approximately the same degree of vulcanization at this stage of the process, which is to say that a relatively slow curing compound preferably is used for the elements 10, 11, a quicker compound for the filler sheet 14, and a still quicker compound for the second filler sheet 20. Adhesion of the several compounds may be improved by applying a coating of rubber cement to each before the next is pressed against it.

When the vulcanizing step illustrated in Fig. 3 is completed the work, in the form of a composite, fabric-faced sheet 23, is removed from the mold sections 19, 21 and split or sliced in a plane parallel to its more extensive faces as shown in Fig. 4, the plane of the cut passing through the several different compounds, which overlap each other in the direction of the thickness of the composite sheet. The cut surface thus presents design elements having colors or color mixtures corresponding respectively to the three types of compounds employed. I do not wholly limit my claims, however, to the use of only three types of compound, as the method is susceptible of various modification.

The slicing of the sheet is best accomplished by means of an ordinary type of leather splitter, as represented in Fig. 4 by the feed rolls 24, 25, band knife 26 and knife-guide 27.

After the composite sheet 23 has been sliced as described, the cut surfaces preferably are smoothed, as by abrading or by further vulcanizing each of the resulting sheets with its cut surface in contact with a smooth-surfaced pressing member.

In the procedure described, the larger design elements being first formed and assembled in spaced relation, distortion of the design is avoided as compared with flowing plastic stock into spaces intervening between relatively small elements, the larger elements having greater stability of position and form. The elements first assembled, being formed as separate blocks, may be economically produced and may be arranged in different design formations in successive assemblies without change of equipment. The first filler stock being molded with interstices or depressions for the reception of another filler stock, an extensive range of color combinations may be conveniently employed.

In the specific procedure described the rubber compositions 14 and 20 are continuous throughout the extent of the composite sheet 23, each providing an integral bonding element common to the several blocks 10, 11, which is of advantage in providing strength in the final product, but I do not wholly limit my claims to this feature. Neither do I wholly limit my claims to molding the depressions in the filler 14 from the reverse side of the assembly.

I claim:

1. The method of making decorative rubber sheeting which comprises assembling in spaced relation a plurality of separate blocks of relatively stiff rubber composition, and flowing a filler of plastic rubber composition by pressure into the spaces between said blocks.

2. The method of making decorative rubber sheeting which comprises assembling in spaced relation a plurality of separate blocks of relatively stiff rubber composition, flowing a filler of plastic rubber composition by pressure into the spaces between said blocks, and slicing the resulting mass through said blocks and filler.

3. A method as defined in claim 1 in which the blocks and the filler are united by vulcanization.

4. A method as defined in claim 2 in which the blocks and the filler are united by vulcanization.

5. The method of making decorative rubber sheeting which comprises preparing an assembly of spaced apart design elements, flowing a filler of plastic rubber composition into the spaces between the same, molding a depression in said filler between said design elements, and flowing a second filler into said depression.

6. The method of making decorative rubber sheeting which comprises pressing a design element of a relatively stiff rubber composition into a mass of plastic rubber composition, molding a depression in the latter adjacent said design element, filling said depression with a second mass of plastic rubber composition, and slicing the resulting mass by a cut extending through said design element and the two said masses.

7. A method as defined in claim 5 in which the first filler is stiffened by vulcanization before the second filler is applied.

8. A method as defined in claim 6 in which the first plastic mass is stiffened by vulcanization before the second plastic mass is applied.

9. The method of making decorative sheeting which comprises pressing a plastic into a matrix, molding a depression in the said plastic, filling said depression with a second plastic, stiffening the plastics, and slicing the resulting composite mass by a cut extending through the several mentioned elements thereof.

10. The method of making a decorative article which comprises preparing a matrix comprising article-forming material, filling the interstices of said matrix with a filler material, forming a depression in said filler material, filling said depression with a second filler material, and removing material from the surface of the composite mass to expose the internal structure thereof as a surface of the article.

11. The method of making decorative sheeting which comprises holding in spaced relation a plurality of design elements of stiff sheeting material, pressing a plastic into the spaces between the same from one side of the assembly while molding depressions in said plastic from the other side of the assembly, filling said depressions with a second plastic, stiffening said plastics, and slicing the resulting composite mass by a cut extending through the several mentioned elements thereof.

12. The method of making decorative sheeting which comprises holding in spaced relation a plurality of design elements of sheeting material, so pressing a sheet of plastic material against said elements as to cause it to give off stock into the spaces between the same but to continue to overlie said design elements as an integral bonding element common to said design elements, molding depressions in the plastic stock in said spaces from the reverse side of the assembly, so pressing a sheet of plastic material against the said reverse side of the assembly as to cause it to give off stock into the said depressions but to continue to overlie the assembly as an integral bonding element common to the said design elements, stiffening the plastic masses, and slicing the resulting composite mass by a cut extending through the said design elements.

In witness whereof I have hereunto set my hand this 12th day of December, 1924.

TOD J. MELL.